US008793236B2

(12) United States Patent  (10) Patent No.: US 8,793,236 B2
Smith et al.  (45) Date of Patent: Jul. 29, 2014

(54) METHOD AND APPARATUS USING HISTORICAL INFLUENCE FOR SUCCESS ATTRIBUTION IN NETWORK SITE ACTIVITY

(71) Applicant: Adobe Systems Incorporated, San Jose, CA (US)

(72) Inventors: Kevin G. Smith, Lehi, UT (US); William Brandon George, Pleasant Grove, UT (US)

(73) Assignee: Adobe Systems Incorporated, San Jose, CA (US)

( * ) Notice: Subject to any disclaimer, the term of this patent is extended or adjusted under 35 U.S.C. 154(b) by 82 days.

(21) Appl. No.: 13/666,880

(22) Filed: Nov. 1, 2012

(65) Prior Publication Data

US 2014/0122503 A1    May 1, 2014

(51) Int. Cl.
*G06F 17/30* (2006.01)

(52) U.S. Cl.
CPC .... *G06F 17/30011* (2013.01); *G06F 17/30861* (2013.01); *G06F 17/30283* (2013.01)
USPC ......... 707/707; 707/821; 705/7.31; 705/14.1; 706/12; 706/45; 704/9

(58) Field of Classification Search
CPC .................... G06F 17/30011; G06F 17/30861; G06F 17/30283
USPC ........... 707/707, 821; 705/7.31, 14.1; 706/12, 706/45; 704/9
See application file for complete search history.

(56) References Cited

U.S. PATENT DOCUMENTS

| | | | |
|---|---|---|---|
| 5,751,283 | A | 5/1998 | Smith |
| 5,760,772 | A | 6/1998 | Austin |
| 5,796,402 | A | 8/1998 | Ellison-Taylor |
| 5,821,931 | A | 10/1998 | Berquist et al. |
| 5,835,087 | A | 11/1998 | Herz et al. |
| 5,870,559 | A | 2/1999 | Leshem et al. |
| 5,966,139 | A | 10/1999 | Anupam et al. |
| 6,008,809 | A | 12/1999 | Brooks |

(Continued)

FOREIGN PATENT DOCUMENTS

WO    00/58866    10/2000
WO    02/23438    3/2002

OTHER PUBLICATIONS

U.S. Appl. No. 09/835,112, filed Apr. 13, 2001, Cambray, et al.
U.S. Appl. No. 10/057,513, filed Jan. 25, 2002, Alston, et al.

(Continued)

*Primary Examiner* — Frantz Coby
(74) *Attorney, Agent, or Firm* — Kilpatrick Townsend & Stockton LLP

(57) ABSTRACT

User actions prior to, and associated with, an online success event may be considered participating actions that may have influenced the user toward the success event. A previously measured success influence metric for the participating actions may be used to determine a historical influence score for each participating action leading up to the success event. Each participating action may be assigned a current success influence score based on that event's historical influence score as a percentage of a combined historical influence score of all the participating actions for the success event. Additionally, the assigned current success influence scores may be combined with the previously measured success influence metric for use as historical influence scores for success attribution regarding further instances of the success event.

20 Claims, 8 Drawing Sheets

(56) References Cited

U.S. PATENT DOCUMENTS

| | | | |
|---|---|---|---|
| 6,026,397 | A | 2/2000 | Sheppard |
| 6,182,097 | B1 | 1/2001 | Hansen et al. |
| 6,188,405 | B1 | 2/2001 | Czerwinski et al. |
| 6,266,649 | B1 | 7/2001 | Linden et al. |
| 6,286,005 | B1 * | 9/2001 | Cannon ............... 705/14.66 |
| 6,310,631 | B1 | 10/2001 | Cecco et al. |
| 6,317,787 | B1 | 11/2001 | Boyd et al. |
| 6,393,479 | B1 | 5/2002 | Glommen et al. |
| 6,414,677 | B1 | 7/2002 | Robertson et al. |
| 6,456,305 | B1 | 9/2002 | Qureshi et al. |
| 6,473,102 | B1 | 10/2002 | Rodden et al. |
| 6,473,738 | B1 | 10/2002 | Garrett |
| 6,486,882 | B1 | 11/2002 | Wolverton et al. |
| 6,489,968 | B1 | 12/2002 | Ortega et al. |
| 6,654,036 | B1 | 11/2003 | Jones |
| 6,671,711 | B1 | 12/2003 | Pirolli et al. |
| 6,704,016 | B1 | 3/2004 | Oliver et al. |
| 6,754,873 | B1 | 6/2004 | Law et al. |
| 6,766,370 | B2 | 7/2004 | Glommen et al. |
| 6,850,988 | B1 | 2/2005 | Reed |
| 6,862,574 | B1 | 3/2005 | Srikant et al. |
| 6,912,534 | B2 | 6/2005 | DeBettencourt et al. |
| 6,950,993 | B2 | 9/2005 | Breinberg |
| 6,963,874 | B2 | 11/2005 | Kasriel et al. |
| 6,968,511 | B1 | 11/2005 | Robertson et al. |
| 6,980,962 | B1 | 12/2005 | Arganbright et al. |
| 7,085,682 | B1 | 8/2006 | Heller et al. |
| 7,295,996 | B2 | 11/2007 | Skinner |
| 7,506,047 | B2 | 3/2009 | Wiles, Jr. |
| 7,603,373 | B2 | 10/2009 | Error et al. |
| 7,668,950 | B2 | 2/2010 | Horowitz et al. |
| 7,792,948 | B2 | 9/2010 | Zhao et al. |
| 8,224,698 | B2 | 7/2012 | Libby et al. |
| 8,260,728 | B1 * | 9/2012 | Walsh et al. ............... 706/12 |
| 2001/0020236 | A1 * | 9/2001 | Cannon ............... 707/1 |
| 2002/0040395 | A1 | 4/2002 | Davis et al. |
| 2002/0042750 | A1 | 4/2002 | Morrison |
| 2002/0087621 | A1 | 7/2002 | Hendriks |
| 2002/0091591 | A1 | 7/2002 | Tsumura et al. |
| 2002/0093529 | A1 | 7/2002 | Daoud et al. |
| 2002/0099812 | A1 | 7/2002 | Davis et al. |
| 2002/0143662 | A1 | 10/2002 | Clark et al. |
| 2002/0152284 | A1 | 10/2002 | Cambray et al. |
| 2002/0165936 | A1 | 11/2002 | Alston et al. |
| 2002/0186237 | A1 | 12/2002 | Bradley et al. |
| 2002/0186253 | A1 | 12/2002 | Rodden et al. |
| 2002/0198939 | A1 | 12/2002 | Lee et al. |
| 2003/0023712 | A1 | 1/2003 | Zhao et al. |
| 2003/0025737 | A1 | 2/2003 | Breinberg |
| 2003/0055883 | A1 | 3/2003 | Wiles, Jr. |
| 2003/0110249 | A1 | 6/2003 | Buus et al. |
| 2003/0128231 | A1 | 7/2003 | Kasriel et al. |
| 2003/0131097 | A1 | 7/2003 | Kasriel et al. |
| 2004/0049417 | A1 | 3/2004 | Nickerson et al. |
| 2004/0059746 | A1 | 3/2004 | Error et al. |
| 2004/0133671 | A1 | 7/2004 | Taniguchi |
| 2004/0174397 | A1 | 9/2004 | Cereghini et al. |
| 2004/0205157 | A1 | 10/2004 | Bibelnieks et al. |
| 2004/0225687 | A1 | 11/2004 | Larsson et al. |
| 2005/0044508 | A1 | 2/2005 | Stockton |
| 2005/0204307 | A1 | 9/2005 | Nadal |
| 2005/0229110 | A1 | 10/2005 | Gegner et al. |
| 2005/0235222 | A1 | 10/2005 | Barbanson et al. |
| 2005/0273727 | A1 | 12/2005 | Barbanson et al. |
| 2006/0143162 | A1 | 6/2006 | Bernacki et al. |
| 2006/0271671 | A1 | 11/2006 | Hansen |
| 2011/0029405 | A1 * | 2/2011 | Cronin et al. ............... 705/26.41 |
| 2011/0231381 | A1 * | 9/2011 | Mercuri ............... 707/706 |
| 2011/0314007 | A1 * | 12/2011 | Dassa et al. ............... 707/723 |
| 2012/0221382 | A1 * | 8/2012 | Kidron ............... 705/14.1 |
| 2013/0311169 | A1 * | 11/2013 | Khan ............... 704/9 |
| 2014/0019205 | A1 * | 1/2014 | Kraus et al. ............... 705/7.31 |
| 2014/0019206 | A1 * | 1/2014 | Kraus et al. ............... 705/7.31 |

OTHER PUBLICATIONS

Hong, Jr., et al., "What Did They Do? Understanding Clickstreams with the WebQuilt Visualization System," WebQuilt homepage http://guir.berkeley.edu/projects/webquilt, pp. 1-7, 2002.

Hong, Jr., et al., "webQuilt: A Framework for Capturing and Visualizing the Web Experience," WebQuilt homepage http://guir.berkeley.edu/projects/webquilt, May 1-5, 2001, pp. 1-8.

Brumbaugh-Duncan, C., "Th Flast(TM) MX Project," New Riders Publisher, Jul. 26, 2002, pp. 1-20, Chapter 2, Safari Books Online [online] [Retrieved on Jul. 10, 2008] Retrieved from the Internet ,URL:http://proquest.safaribooksonline.com/0735712832>.

"WebTrends 7 Report User's Guide," Mar. 2005, pp. I-VIII, 1-82 [Online] [Retrieved on Dec. 15, 2008] Retrieved from them Internet <URL:http://product.webtrends.com/WRC/7.1/Documents/ReportUsersGuide.pdf.

"WebTrends Guide to Web Analytics," Jan. 2005, pp. I-X, 1-224 [Online] [Retrieved on Dec. 15, 2008] Retrieved from them Internet <URL:http://product.webtrends.com/WRC/7.1/Documents/WebAnalytics.pdf.

U.S. Appl. No. 12/190,836, filed Aug. 13, 2008, Song, et al.

U.S. Appl. No. 12/025,642, filed Feb. 4, 2008, Sharma, et al.

\* cited by examiner

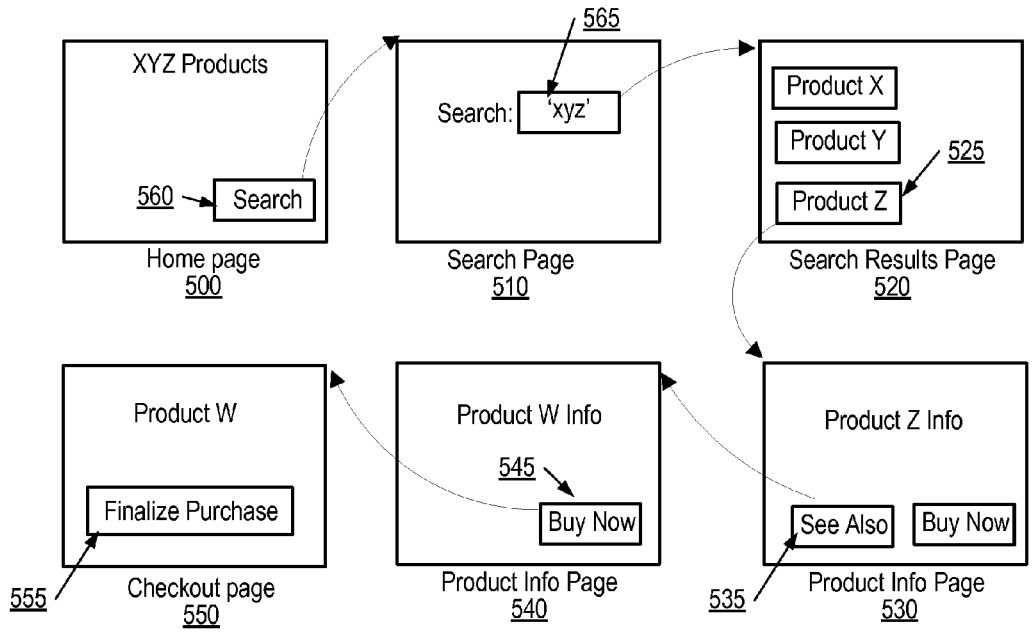

FIG. 5 data log 600

| Site | Time/Date | User Identifier | User Action |
|---|---|---|---|
| Web Site One | 10 Oct 2012 13:07:24 | User One | View home page |
| Web Site One | 10 Oct 2012 13:08:06 | User One | Web search "xyz" |
| Web Site One | 10 Oct 2012 13:08:12 | User One | View Search Results |
| Web Site One | 10 Oct 2012 13:09:33 | User One | View Product Z Info |
| Web Site One | 10 Oct 2012 13:12:41 | User One | Select See Also |
| Web Site One | 10 Oct 2012 13:13:01 | User One | View Product W info |
| Web Site One | 10 Oct 2012 13:17:23 | User One | Select Buy Now |
| Web Site One | 10 Oct 2012 13:17:28 | User One | View Checkout Page |
| Web Site One | 10 Oct 2012 13:18:52 | User One | Purchase Product W |
| Web Site Two | 15 Oct 2012 10:34:19 | User Two | View home page |
| Web Site Two | 15 Oct 2012 13:35:22 | User Two | Internal Search "ijk" |
| Web Site Two | 15 Oct 2012 13:35:27 | User Two | View Search Results |
| Web Site Two | 15 Oct 2012 13:35:48 | User Two | View Product K Info |
| Web Site Two | 15 Oct 2012 13:38:24 | User Two | Select Buy Now |
| Web Site Two | 15 Oct 2012 13:38:27 | User Two | View Checkout Page |
| Web Site Two | 15 Oct 2012 13:39:08 | User Two | Purchase Product K |

FIG. 6

Historical influence database 170

| Success Event | User Action 1 | User Action 2 | User Action 3 | User Action 4 | User Action 5 |
|---|---|---|---|---|---|
| A | .02 | .05 | .1 | .01 | 1.0 |
| B | .11 | .03 | .08 | .04 | .00 |
| C | .1 | .1 | .1 | .1 | 1.0 |
| D | .01 | .01 | .01 | .01 | .00 |

FIG. 7

| Participating Action | Historical Influence Score | Current Success Influence | Linear Influence |
|---|---|---|---|
| PA 1 | .02 | 11% | 25% |
| PA 2 | .05 | 27% | 25% |
| PA 3 | .1 | 56% | 25% |
| PA 4 | .01 | 6% | 25% |

FIG. 8 ive influence on previous success events. Success influence scores (or values) may in some embodiments be summed across the participating actions and divided into the individual participating action's historical influence score to determine a current influence score for the participating action. The current influence score may indicate a level of contribution by the participating action toward the success event, according to some embodiments.

METHOD AND APPARATUS USING HISTORICAL INFLUENCE FOR SUCCESS ATTRIBUTION IN NETWORK SITE ACTIVITY

BACKGROUND

Attribution modeling is a practice in which one or more of a user's online actions are given the credit for influencing a particular desired user action. A desired user action may be referred to as a conversion or success event. Attribution modeling may be applied to various types of online activity, from display ads on search engines, to search keywords, to "liking" social media blog entries, to views of individual web pages. For instance, if a user performs three internal searches for kw1, kw2, and kw3 in that order, and then makes a purchase, attribution modeling may be used to determine which search term deserves credit for influencing the purchase. Thus, an attribution model may be considered a rule that determines how credit for a success event (i.e., desired user action), such as an online purchase, may be assigned to one or more of the actions a user performed prior to performing the success event.

Some common attribution models include Last Touch, First Touch, and Linear, among others. In a Last Touch attribution model, the last user action prior to the success event would be given all of the credit for influencing the success event. A Last Touch model assumes that the last thing a user did before converting had the largest influence on the user. In the online purchase example above, kw3 (e.g., the last internal keyword search) would be given the credit for influencing the user to make the purchase.

In a First Touch attribution model, the first action to occur receives the credit for the success event. This model assumes that the first action of a user deserves credit for influencing the user in the subsequent actions, including the success event. In the online purchase example above, kw1 (e.g., the first internal keyword search) would be given the credit for influencing the user to make the purchase.

In a Linear attribution model, all actions prior to a success event get an equal share of the credit for influencing the user. Rather than assuming that a single one of the user's actions deserves all the credit, this model assumes that any, or all, of the user's actions influence the user. In the online purchase example above, each of the three keywords (kw1, kw2 and kw3) would be given a third of the credit for influencing the user to make the purchase.

None of the above attribution models may be 100% accurate and each model may have individual disadvantages that apply in different situations or scenarios. Each of these model rely on the assumption that over time (i.e., across multiple success events) the stronger influences may become apparent.

SUMMARY

Described herein are various embodiments of systems and methods for using historical influence for success attribution. In one embodiment, a method for success attribution using historical influence may include associating one or more participating actions with a success event or desired outcome, where each participating action comprises a user action on a network-based content site and where the success event is a desired action on the network-based content site. The method may also include determining a historical influence score for each of the one or more participating actions based on a previously measured metric associating the participating actions with previous instances of the success event, where the previously measured metric may comprise a historical influence score for each respective participating action. The method may further include assigning a current success influence score to each participating action based on the respective participating action's historical influence score as a proportion of a total of the historical influence scores of the one or more participating actions. Thus, the current success influence score may indicate a level of contribution by the respective participating action toward the success event or desired outcome.

BRIEF DESCRIPTION OF THE DRAWINGS

FIG. 5 is a logical block diagram illustrating example participating actions and success events on a network-based content site, according to one embodiment.

FIG. 6 is an example view of a historical data log illustrating participating actions and success events for two users, according to one embodiment.

FIG. 7 is a block diagram illustrating, according to one embodiment, the respective historical influence scores for participating actions by success events.

FIG. 8 is a block diagram illustrating example current success influence scores for participating actions according to the actions' respective historical influence scores, according to one embodiment.

DETAILED DESCRIPTION OF EMBODIMENTS

Figure 1:
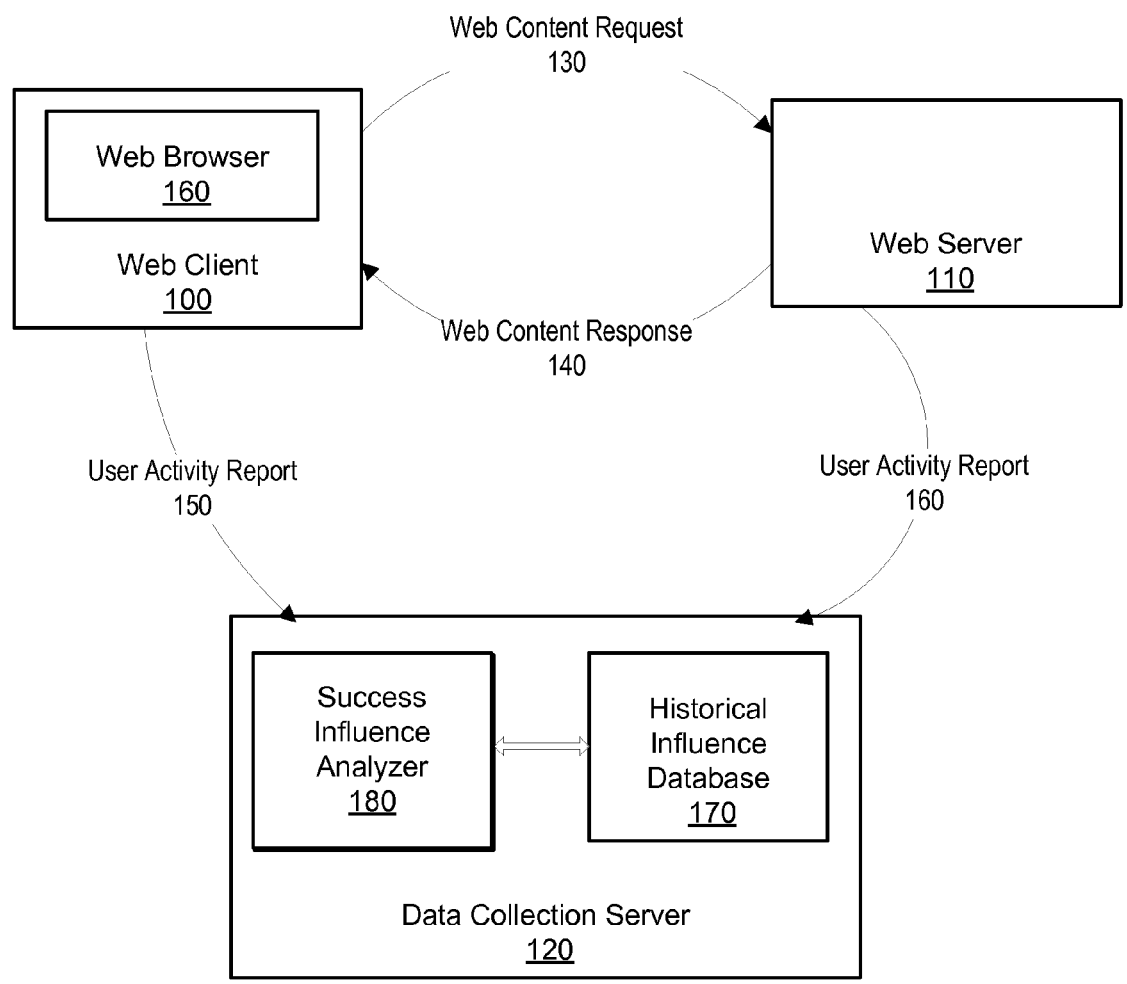
FIG. 1 is a logical block diagram illustrating, according to one embodiment, a system configured to perform success attribution using historical influence, as described herein.

Using historical influence for success attribution may include ascribing to user actions an amount of credit for influencing a success event based on the actions' previous influence on the success event, as described herein. A success event, sometime referred to as a conversion, may be considered virtually any desired outcome, such as a particular user action, an online purchase, a request for information, registering at a web site, or a social media action (e.g., "liking" or becoming a friend/fan), according to some embodiments. User actions prior to, and associated with, the success event may be considered participating actions that may have influenced the user toward the success event.

A previously measured success influence metric may be used to determine a historical influence score for each participating action leading up to a success event. When the success event occurs, credit (or influence) for the success event may be apportioned to each of the participating actions according to the historical influence score of the respective participating action, according to some embodiments. For instance, each participating action may be assigned a current success influence score (or value) based on that event's historical influence score as a percentage of the combined historical influence scores of all the participating actions for the same success event. Thus, rather than selecting a single action or giving all participating actions equal credit, success attribution using historical influence may give all participating actions some credit, but may assign more credit to those participating actions that have historically exhibited a larger influence in the past.

Any or all of a user's actions, including, but not limited to viewing web pages or searching for particular keywords, may help to influence that user to decide a perform a particular desired action, such as completing an online purchase, requesting more information from a web site, viewing a particular web page, or any of various other desired actions. Thus, the user's actions may be associated with a particular desired outcome. Assigning credit for that influence among the user's (possibly many) actions may involve determining how those same actions have historically influenced users to perform the same or a similar desired action. Thus, a software module responsible for assigning influence to user actions may determine a historical value indicating how well individual user actions (viewing web pages, making searches, selecting individual web links, etc.) have influenced users in the past. For instance, the software module may load historical data showing how well each action has historically influenced users as compared to other actions. The software module may then assign each action a score indicating that action's historical influence as a proportion of the combined influence of all the user's actions. Thus, when assigning influence to user actions, a software module may give varying amounts of credit to the various user actions according to how well each action has historically influenced users to perform the particular desired action (such as an online purchase, user registration, etc.).

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As noted above, rather than giving all participating actions equal credit in a blind fashion, success attribution using historical influence, as described herein, may give all participating actions some credit, but may assign more credit to those participating actions that have historically played a larger role in success. For example, if a user performed four internal keyword searches on a web site prior to purchasing a product, each keyword may be given credit for a certain portion of the overall success event (i.e., the product purchase) based on that keyword's historical influence related to purchases of the product. While in some embodiments, only the participating action's historical influence as related to a specific success event, such as the purchase of a particular product, may be used when assigning a current success influence score or value, but in other embodiments, the participating action's broader historical influence, such as its historical influence on purchasing products in general, may be used when assigning a current success influence score. A participating action's historical influence score may be an aggregate value of the participating action's historical influence, according to some embodiments.

A participating action's historical influence score may represent that action's previous influence on a success event as determined for one or more previous instances of the success event. In general, historical influence scores may include, or be determined using, any of various metrics. For example, in one embodiment a participating action's historical conversion ratio (e.g., the percentage of time the participating action was associated with past instances of the success event) may be used as the participating action's historical influence score. In other embodiments, other statistical models may be used to determine a participating action's historical influence. In addition, a participating action's historical influence score may represent that action's historical influence as determined by any of various attribution models (e.g., First Touch, Last Touch, Linear, etc.), according to various embodiments. Thus, while a participating action's current success influence score may be determined as described herein, in some embodiments, the action's historical influence score may have been determined, at least in part, using one or more other attribution models.

In some embodiments a participating action's historical influence score may represent the participating action's influence only over a particular period of time, such as over the most recent month, quarter, year, etc. In other words, a recency threshold (or age threshold) may be used in order to only use the more recent influence of participating actions. Similarly, in some embodiments, other common statistical methodologies such as removing outliers, etc., may also be used to apply more selective use of historical influence scores.

FIG. 1 is a block diagram illustrating a networked system including a Data Collection Server 120 that may, in some embodiments, be configured to perform success attribution by historical influence, as described herein. As shown in FIG. 1, a user may use a Web Browser 160 on Web Client 100 to view content, such as various web pages, from Web Server 110. For example, in response to the user selecting a web link (or specifying a URL) Web Client 100 may retrieve the specified content from Web Server 110 via Web Content Request 130 and Web Content Response 140. In one embodiment, Web Content Request 130 may represent HTTP based network communication and Web Content Response 140 may represent HTML based web content configured to send notifications of user activity.

In order to record historical influence scores for participating actions of the user, one or more user activity reports, such as User Activity Reports 150 and 160 may be sent to Data Collection Server 120. In one embodiment, Web Client 100 may be configured to deliver a user activity report to Data Collection Server after each user action. In other embodiments, Web Server 110 may be configured to deliver user activity reports to Data Collection Server 120. According to various embodiments, User Activity Reports may include information regarding a user's actions on one or more network-enabled content sites (e.g., web sites). For instance, a user activity report may include information about one or more links used by the user to navigate among pages of the site and/or may include information identifying one or more searches performed by the user. In general, information regarding virtually any user action may be included in a user activity report.

In some embodiments, the data from user activity reports may be stored in a data store, such as Historical Influence Database 170 and Success Influence Analyzer 180 may be configured to access Historical Influence Database 170 when using historical influence for success attribution, as described here. Please note that while illustrated in FIG. 1 as separate modules of a single server, in some embodiments, Success Influence Analyzer 180 and Historical Influence Database 170 may be configured as part of a single module or as separate modules on separate servers (or other devices). In addition, while described herein in terms of user activity reports, in general, information regarding user activity and user actions may be collected and stored in Historical Influence Database 170 using any sort of data format and/or data communication standard.

In one embodiment, Historical Influence Database 170 may store all information from each user activity report and thus may represent a log of user activity, while, in other embodiments, only some of the information from user activity reports may be stored. In some embodiments, Data Collection Server 120 may be configured to analyze the collected user activity data and keep only an aggregate of the data from user activity reports. For instance, in one embodiment, Historical Influence Database 170 may include aggregate historical influence scores for participating actions by success events and Data Collection Server may update a participating action's historical influence score based on collected user activity data. For example, if the collected user activity data indicate that a user performed a search for keyword 1 and then purchased product X, Data Collection Server 120 (and/or Success Influence Analyzer 180) may update the stored aggregate historical influence score for keyword 1 accordingly. Please note that the use of the term database herein is not meant to imply any particular sort of data organization or structure. Historical Influence Database 170 may, in various embodiments, represent any collection of data, however organized.

In another embodiment, Data Collection Server 120 may be configured to store a log of all collected user activity, such as to allow the data to be analyzed, grouped and/or culled in various manners. In some embodiments, historical influence scores may be determined from a log of user activity that may include participating actions and success events. In other embodiments, however, historical influence scores may be determined from a stored aggregate influence value for each associated pair of participating action and success event. Aggregate influence values may be calculated using various formulas, metrics and/or attribution models, according to various embodiments. For example, in one embodiment, a participating action's aggregate influence value may be calculated using all previously recorded success influence scores for the action (when associated with the particular success event or group of success events). In another embodiment, an aggregate influence score may only include a maximum number of previously success influence scores or only success influence scores for success events that occurred within a certain time period.

For example, Historical Influence Database 170 may store information indicating the number of times product X has been purchased and the number of times the user searched for keyword 1 before purchasing product X. When user activity reports indicate that a user has searched for keyword 1 and then purchased product X, Data Collection Server 120 may update the number of times product X has been purchased and also update the historical influence score for keyword 1 based on the updated information.

In some embodiments, historical influence scores may be determined regarding participating actions and specific success events, such as an online purchase of a particular product, while in other embodiments, historical influence scores may be determined for broader groups/categories of success events, such as for all purchases of a particular group of related products/services or for all purchases through a particular network-enable content site. Similarly, aggregate influence values may be calculated using historical influence scores for broader or narrower categories of success events, according to various embodiments. Thus, success attribution by historical influence, as described herein, may be used to analyze and assign success influence scores across a wide range of success events. Additionally, the exact types and/or categories of success events for which success attribution and/or analysis may be configurable, such as via an options module of Success Influence Analyzer 180, according to one embodiment.

In one embodiment, Historical Influence Database 170 may include an aggregate historical influence score for each participating action. For example, the historical conversion ratio (e.g., the percentage of times a participating action was associated with the success event as compared to the total number of instances of the success event). In other embodiments, however, other historical influence metrics may also be used, either alone or in combination.

In some embodiments, Success Influence Analyzer 180 may be configured to update or add data to Historical Influence Database 170. For instance, in one embodiment, Success Influence Analyzer 180 may be configured to update historical influence scores for the participating actions based on the determined current success influence scores. For example, in one embodiment, Success Influence Analyzer 180 may be configured to determine a new updated aggregate influence value for each participating action associated with the current success event based on a combination of the respective participating action's current success influence score and the previous aggregate influence value for that action (i.e., as used when determining the current success influence score). Thus, the historical influence data in Historical Influence Database 170 may change over time and may reflect recent changes regarding which user actions influence success events.

Figure 2:
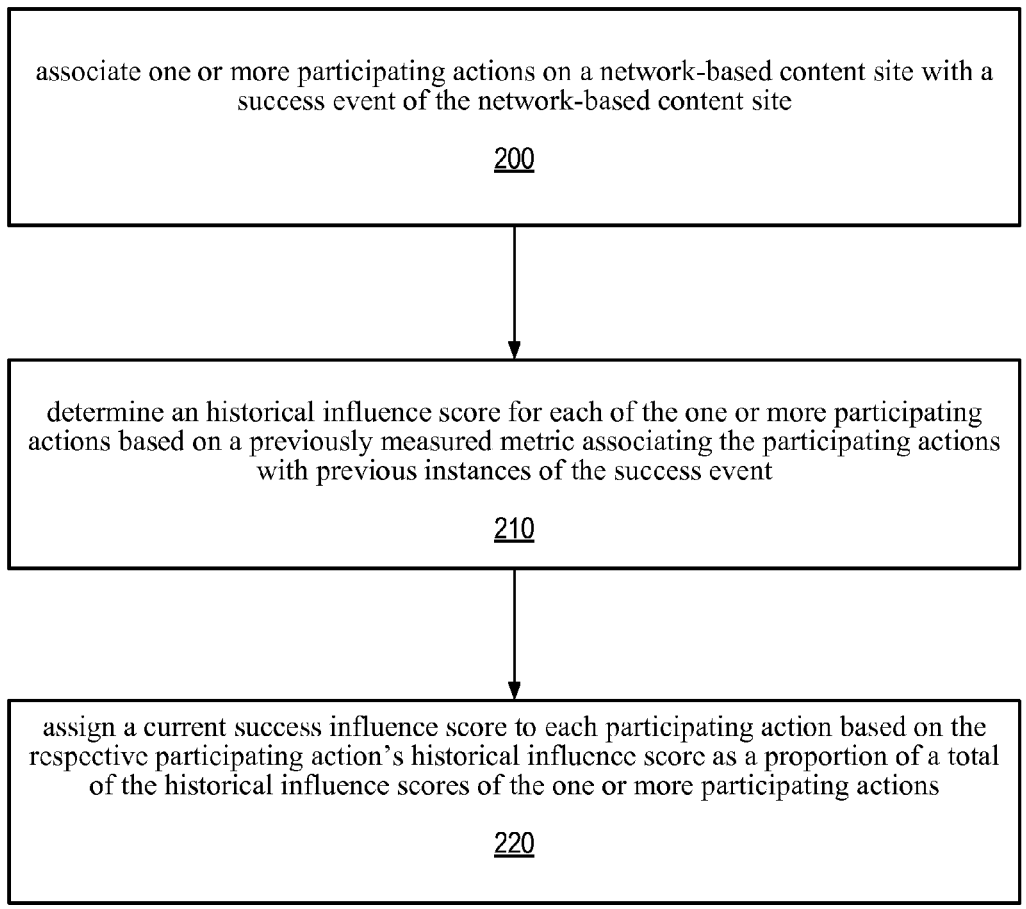
FIG. 2 is a flowchart illustrating one embodiment of a method for using historical influence for success attribution.

FIG. 2 is flowchart illustrating one embodiment of a method for performing success attribution by historical influence, as described herein. A success influence analyzer may, in some embodiments, associate one or more participating actions on a network-based content site with a success event of the network-based content site, as shown in block 200. As used herein, a network-based content site may, according to various embodiments, represent a set of related web pages (or other documents) containing content such as text, images, video, audio, etc. A network-based content site may be hosted on one or more web servers and may be accessible via network, such as the Internet or a local area network. A user may view and explore the contents of a network-based content site and may perform various actions, such as performing keyword searches, selecting various pages on the site via menus, toolbars, icon bars, or other links, and may also perform a desired success event. A success event may, in some embodiments, include any of various types of desired user actions on a network-based content site, such as an online purchase, a website registration, filling out an online form, requesting further information, or specifying that the user "likes" or "friends" a website, page, link, product, user, etc., among others.

As part of using historical influence for success attribution, a user's actions on a network-based content site may be associated with one or more success events performed by that user. For example, each page the user views and each query the user performs, as well as other actions the user performs, may be associated with a success event, such as purchasing a product. The methods described herein for success attribution by historical influence may also involve determining a historical influence score for each of the one or more participating actions based on a previously measured metric that associates the participating actions with previous instances of the success event, as shown in block 210. For example, in one embodiment, after associating the one or more participating actions with a success event, success influence analyzer 180 may retrieve a previously measured metric, such as from historical influence database 170. The previously measured metric may include data representing a historical influence score for each of the participating actions. For instance, in one embodiment, historical influence database 170 may include information that gives the percentage of times that each participating action contributed to the success event. For example, if 2% of the times a user made an online purchase they also performed a search for keyword 1, keyword 1 may be given a historical influence score of 0.02 (2%) in historical influence database 170.

Success Influence Analyzer 180 may then assign a current success influence score to each participating action based on the respective participating action's historical influence score as a proportion of a total of the combined historical influence scores of the participating actions, as shown in block 220, according to one embodiment. For instance, if a user performed 4 keyword searches prior to making an online purchase, Success Influence Analyzer 180 may, in one embodiment, add up the historical influence scores for all participating actions and then divide each action's historical influence score by the total of the historical influence scores to determine the respective action's portion of the current success influence score. Thus, a participating action's current success influence score may indicate a level of contribution by the participating action toward the success event. For example, if the four keywords, KW1, KW2, KW3, and KW4 had respective historical influence score of 0.02, 0.05, 0.1 and 0.01, then, in one embodiment, KW1 may be assigned a current success influence score of 0.11 by dividing 0.02 (KW1's historical influence score) by 0.18 (the total historical influence score), as shown in the table below.

| SEARCH TERM | Historical Influence Value |
| --- | --- |
| Kw1 | .02 |
| Kw2 | .05 |
| Kw3 | .1 |
| Kw4 | .01 |

In some embodiments, assigning a current success influence score may include attributing a portion of an overall success value for the success event. A success event's overall success value may be considered a total value or score for the success event which may be apportioned to various participating actions associated with the success event. In the example above, the success event's overall success value may be considered 1.0, thus KW1 may receive a current success influence score of 11. In another example, a success event relating to an online purchase may be given an overall success value equal to the price of the purchase. Thus, in some embodiments, a participating action's current success influence score may represent the action's respective proportion of the total historical success score multiplied by the success event's overall success value. Continuing with the above example, if the success event was an online purchase worth $5.00, KW1 may be assigned a current success influence score of $0.55 (i.e., 11% of $5.00).

Figure 3:
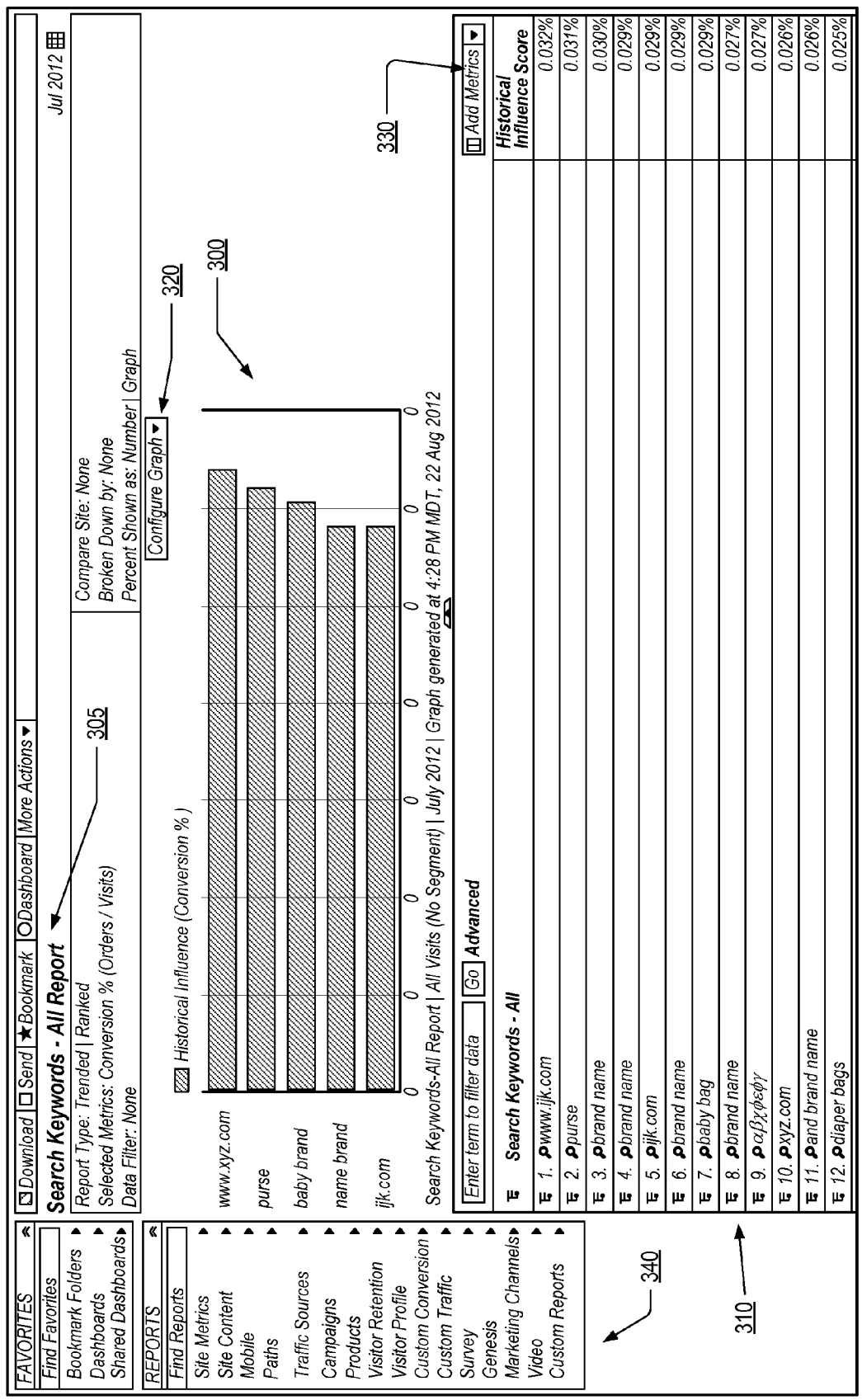
FIG. 3 is an example screen shot showing that may, in one embodiment, be used with success attribution using historical influence, as described herein.

In addition, according to some embodiments, Data Collection Server 120 and/or Success Influence Analyzer 180 may be configured to allow user or administrator to view and/or analyze the data stored in Historical Influence Database 170. For instance, FIG. 3 is an example screenshot illustrating example analysis of data stored in Historical Influence Database 170. As shown in FIG. 3, Data Collection Server 120 may be configured to display the historical influence score (such as historical conversion %) for various participating actions.

For example, as illustrated in the screenshot of FIG. 3, a user may select any of various reports, illustrated by reports listing 340 on the left side of the screen shot. In response, Success Influence Analyzer 180 may then display details regarding the selected report type. Thus, as shown in FIG. 3, a "Search Keywords—All" report may be displayed, as indicated by report header 305, according to one embodiment. For each report type, various types of information and/or controls may be displayed, such as Configure Graph control 320, bar graph 300, keyword listing 310 and Add Metrics control 320. Thus, in the example shown in FIG. 3, various participating actions, such as the actions displayed as part of bar graph 300 may be selected for more detailed analysis/comparison. In the example screenshot of FIG. 3, for instance, the respective historical influence scores (e.g., conversion ratios) of the five selected participating actions (e.g., search keywords) may be displayed using a bar graph. However, historical influence scores (e.g., conversion ratio) for other participating actions, such as the keywords in keyword listing 310, may be displayed in other manners, such as the numeric historical influence scores listed on the right end of keyword listing 310.

Please note that generic terms, such as purse, baby brand, name brand, etc., are used herein and in FIG. 3, but in actual usage actual brand names may be used as participating actions (such as in keyword searches) and those actual brand names may be selectable and displayed as participating actions in various screens of Success Influence Analyzer 180, as shown FIG. 3.

In FIG. 3, the horizontal bar graph illustrated is merely one example and may represent any of various graphs or data display types according to various embodiments. For example, in one embodiment, Success Influence Analyzer 180 may be configured to display and/or compare the historical influence score for one or more participating actions. Success Influence Analyzer 180 may also be configured to display and/or compare the current success influence scores assigned for a particular instance of a success event. In yet other embodiments, Success Influence Analyzer 180 may be configured to display aggregate influence values (either current or historical) for a variable time period, such as to allow analysis of changing influence values over different type periods. Further, Success Influence Analyzer 180 may also be configured to display influence values for participating actions across multiple success event types, such to illustrate how influential a particular participating action in for multiple success events.

While described above in regards to Success Influence Analyzer 180, in some embodiments, other applications, programs or modules, such as Historical Influence Database 170, may be configured to allow a user to view and/or analyze current or historical influence data for participating actions and success events.

Figure 4:
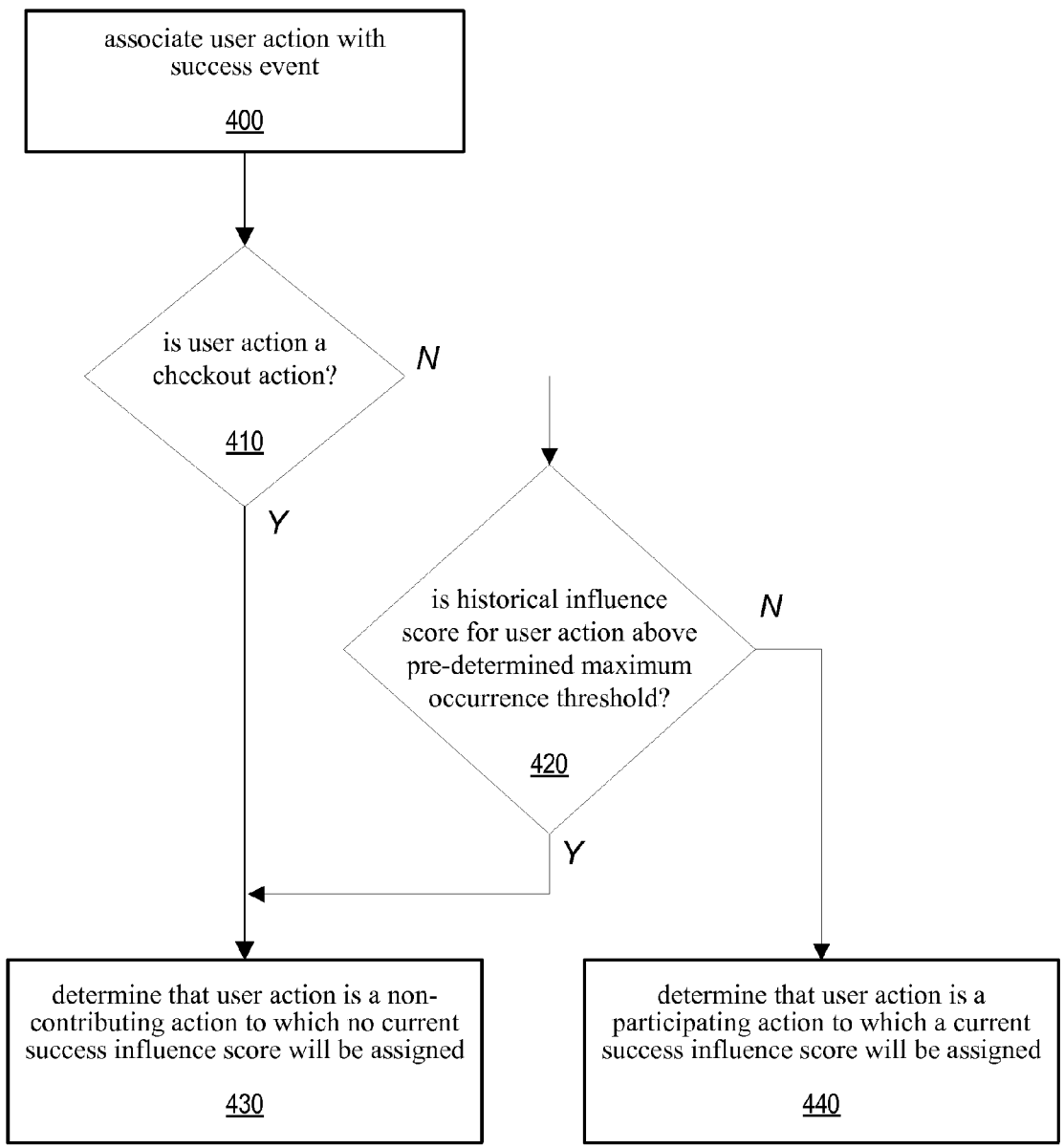
FIG. 4 is a flowchart illustrating one embodiment of a method for success attribution using historical influence, as described herein.

FIG. 4 is a flowchart illustrating one embodiment of a method using historical influence for success attribution, as described herein. As described above, user actions performed on a network-based content site may be associated with a success event. However, in some embodiments, not all user actions may actually influence the user's decision to make the desired outcome (e.g., the success event). Instead, some user actions may be associated with a success event for reasons that don't influence the user. A user action that is determined not to influence the user's decision regarding a success event may be referred to a non-contributing action. For example, many web sites allowing users to make online purchase include one or more checkout pages that must be viewed prior to finalizing a purchase. For instance, a user may first have to view a checkout page that lists the items to be purchased and may then have to enter credit card or other financial information related to paying for the purchase. In some embodiments, neither a checkout page, nor a page requesting financial information may be considered to have influence the user's decision to purchase the product. In other embodiments, however, viewing such pages may be considered participating actions, such as to determine whether or not those page change a user's decision to purchase an item via that particular online store, for example.

Thus, as illustrated in block 400 of FIG. 4, Success Influence Analyzer 180 may be configured to associate a user action with a success event. User actions may be determined to be non-contributing actions by different manners and methods, according to different embodiments. For instance, in some embodiments Success Influence Analyzer 180 may be configured to recognize particular user actions as non-contributing actions by identification. For example, as illustrated in decision block 410, Success Influence Analyzer 180 may be configured to recognize that a user action represents viewing a checkout page and therefore consider that user action a non-contributing action.

Similarly, in some embodiments, Success Influence Analyzer 180 may be configured to utilize a maximum occurrence threshold when determining whether user actions should be considered participating actions or non-contributing actions. Thus, if a user action is associated too often with a success event, that user action may, in some embodiments, be considered a non-contributing action. For example, user actions that occur frequently, but which have little or no actual influence on a success event, such as user login or checkout pages, may be considered non-contributing actions. A user action's historical influence score may be used to determine whether or not the action has been associated too often with a success event (or events), according to one embodiment. Thus, as illustrated by decision block 420, Success Influence Analyzer 180 may be configured to determine if a user action's historical influence score is above a predetermined maximum occurrence threshold and, if so, Success Influence Analyzer 180 may consider that user action a non-contributing action.

Please note that a user action may be considered a non-contributing action for any of various reasons, and not just for the two exemplary reasons illustrated by blocks 410 and 420 of FIG. 4. Furthermore, whether a particular user action is considered a participating action or a non-contributing action may vary from success event to success event, according to various embodiments. In other words, a user action may be considered a participating action when associated with one success event, but may be considered a non-contributing action when associated with a different success event.

As shown by the positive outputs of blocks 410 and 420, Success Influence Analyzer 180 may determine that a user action is a non-contributing user action to which no current success influence score may be assigned. Alternatively, as indicated by the negative outputs of block 410 and 420, Success Influence Analyzer 180 may determine that a user action is a participating action to which a current success influence score may be assigned.

Thus, a non-contributing user action may not be considered a participating action and may therefore be ignored by Success Influence Analyzer 180 when assigning success influence scores to participating user actions. Success influence scores may not be determined, assigned or attributed to non-contributing actions in order to avoid giving undue influence to a user action that does not actually contribute to the success event, according to some embodiments. In other embodiments, all user actions associated with a success event may initially be considered participating actions, but those determined to be non-contributing actions may be culled out of the participating actions prior to assigning current success influence scores.

FIG. 5 is a logical block diagram illustrating, according to one embodiment, participating actions and success events for a network-enabled content site. A network-enabled content site, such as a web site, may include multiple pages, each with one or more controls and/or links via which a user may interact with the site. As noted above, the actions a user takes when interacting with a site may be associated with one or more success events that occur on that site. For example, as illustrated in FIG. 5, a user may first navigate amongst various pages of the site before making a purchase through the site. Thus, from Home page 500, a user may select a search control 560 that may take the user to Search page 510. The user may enter a search keyword 'xyz' into the search control 565 which may result in the user viewing Search Results Page 520. Search Results Page 520 may display links to one or more products that match the user's search criteria, such as products X, Y, and Z in the example of FIG. 5. After selecting the link 525 the user may be view Product Info Page 530 displaying information related the product Z.

Continuing the example illustrated in FIG. 5, the user may select See also control 535 in order to view Product Info Page

540 displaying information on product W, which may be related to product Z in some fashion. After deciding to purchase product W, the user may select Buy Now control 545 which may display Checkout Page 550 allowing the user to finalize the purchase of product W via control 555.

During the user's navigation through the various pages of the example site illustrated in FIG. 5, various participating actions may be associated with the success event. In the example above for instance, the search keyword 'xyz', as well as Search Results Page 520, Product Z link 525, Product Info Page 530, See Also link 535, Product Info Page 540, and Buy Now link 545 may be participating actions associated with the success event of purchasing item W, according to some embodiments.

In one embodiment, Checkout Page 550 may also be considered one of the participating actions associated with the success event. In other embodiments, however, Checkout Page 550 may not be considered a participating action for a purchasing success event since every user may be required to visit the Checkout Page when purchasing any product. In other words, in some embodiments, certain user actions (such as viewing a Checkout Page) may be considered non-contributing actions and success influence scores may not be assigned to those user actions.

While the example above regarding FIG. 5 refers to a user searching and navigating a web site to purchase a product online, participating actions and success events may be collected and analyzed for any of various types of online activities. For example, in one embodiment, a success event may represent a user becoming a "fan" or indicating they "like" some person, product, site, or other entity on a social media site and the user's activities on the social media site may be considered participating actions associated with the success event.

Similarly, participating actions and success events may not be associated with a single network-enabled content site. For example, in one embodiment, a user may visit pages on various web sites before viewing a filling out a particular information form on a separate site. Thus, each of the pages on the different sites may be considered participating actions associated with the filling out of the form on the separate site. Similarly, user actions leading to a social media site may be considered participating actions associated with an action on the social media site.

Additionally, only those participating actions that occurred within a certain period of time prior to the success event may be associated with the success event, according to some embodiments. For example, in one embodiment, only the user's activities for the previous 30 minutes may be associated with a success event. In other embodiments, a period of inactivity may be considered breaks between user sessions and user activities prior to a period of inactivity may not be associated with a success event occurring after the period of inactivity.

FIG. 6 is a logical block diagram illustrating an example data log that includes participating actions for a success event. As illustrated in FIG. 6, a data log may include various types of information regarding participating actions and success events. For example, in one embodiment, data recorded for a participating action may include a site identifier, a date/time stamp, a user identifier, as well as information identifying the particular user action. In other embodiments, however, more, less or different data may be recorded for user actions and success events.

With reference to the example described above regarding FIG. 5, data log 600 illustrates a log of user actions associated with the success event of User One purchasing product W on Web Site One. Data log 600 further illustrates a log of user actions associated with the success event of User Two purchasing product K on Web Site Two.

In some embodiments, Success Influence Analyzer 180 may be configured to collect and associate user activity data, such as the participating actions, with a success event. While FIG. 6 illustrates an example data log representing a table of columns, Success Influence Analyzer 180 may be configured to record and analyze user activity, including participating actions and success events in any of various data formats, according to different embodiments.

Thus, Success Influence Analyzer 180 may be configured to determine a historical influence score (or value) for each of the participating actions in data log 600. For example, Success Influence Analyzer 180 may be configured to obtain historical influence scores from a stored database or other data source. Referring now to FIG. 7, Success Influence Analyzer 180 may be configured to retrieve data from a historical influence database 170 that includes historical influence scores of various participating actions for different success events. For instance, historical influence database 170 may indicate that User Action 1 may have a historical influence score of 0.02 for success event A, while User Action 2 may have a historical influence score of 0.05 for success event A.

As noted above, a historical influence score for a user action may represent that action's previous influence on only one particular success event (such as a purchase of a particular item), or may alternatively represent that action's previous influence on multiple success events (such as a class or category of success events). Additionally, in some embodiments, a user action's historical influence score may represent an aggregate of the action's prior historical influence (either for a single or multiple success events). Similarly, in some embodiments, a user action's historical influence score may represent only the action's more recent historical influence, or alternatively may represent the action's historical influence over a longer period of time. Thus, the historical influence data illustrated in FIG. 7 may represent the historical success influence of User Actions 1-5 as associated with Success Events A-D occurring on a single network-based content site (such as Site One in the log of FIG. 6). In other embodiments, however, the historical influence data illustrated in FIG. 7 may represent the historical success influence of User Actions 1-5 as associated with Success Events A-D on multiple network-based content sites (such as both Site One and Site Two in the log of FIG. 6).

As noted above, if a user action is associated too often with a success event, that user action may be considered a non-contributing action, according to some embodiments. For example, User Action 5 in the example embodiment illustrated in FIG. 7 may have a historical influence score of 1.0 for success events A and C any may have a historical influence score of 0.0 for success events B and D. In this example, User Action 5 may represent a checkout page, such as Checkout Page 550 of FIG. 5. As described above, a checkout page of a web site may always be associated with purchases made via that web site. Thus, in FIG. 7, success events A and C may represent online purchases in which User Action 5 represents the relevant checkout page, while success events B and D may represent some other type (or types) of success events in which the checkout page (represented by User Action 5) is not associated, according to the example embodiment illustrated in FIG. 7.

In some embodiments, user actions that occur frequently, but which have little or no actual influence on a success event, such as user login or checkout pages, may be considered non-contributing actions. Success Influence Analyzer 180 may be configured to treat user actions which are associated with a success event more often than a predetermined occurrence threshold as non-contributing actions. Using the example illustrated in FIG. 7, User Action 5 may be associated with success events A and D more frequently than a predetermined occurrence threshold while user actions 1-4 may not. Whether a particular user action is considered a participating action or a non-contributing action may vary from success event to success event, according to various embodiments. For example, a user login page may be considered a participating action when associated with one success event, but may be considered a non-contributing action when associated with a different success event As described above, historical influence score may be kept for user actions (which may be considered either participating or non-contributing action, in various circumstances) associated with various types of success events. Thus, in some embodiments, Success Event A may represent an online purchase of a particular product or service. In other embodiments however, Success Event A may represent the purchase of a product, the viewing of a particular web page, the filling out of an online form, or virtually any other desired user action or activity.

Additionally, in some embodiments, historical influence scores, such as may be stored in Historical Influence Database 170, may represent user actions associated with success events for a single network-based content site (such as a web site), while in other embodiments, stored historical influence scores may represent user actions associated with success events for multiple sites. In yet other embodiments, historical influence scores may be stored for success events on multiple sites, but in such a manner as to allow Success Analyzer 180 to determine the historical influence score on a site by site basis. Similarly, stored influence values may represent the historical influence of user actions that occurred only during a particular time period (such as within the previous, week, month, quarter, year, etc.), according to some embodiments.

Please note that while displayed in FIG. 7 as a database table, Success Influence Analyzer 180 and/or Historical Influence Database 170 may be configured collect, store, and/or retrieve historical influence data in any format and/or data structure, according to various embodiments.

As described above, Success Influence Analyzer 180 may be configured to assign current success influence scores to each of the participating actions associated with the success event. FIG. 8 illustrates a table showing the assigning of current success influence scores for four participating actions according to their respective historical influence scores, according to one embodiment.

Success Influence Analyzer 180 may have determined the historical influence scores for each of the four participating actions (e.g., PA 1, PA 2, PA 3, and PA 4), such as by retrieving information from historical influence database 170, as noted above. Success Influence Analyzer 180 may be configured to total up the historical influence scores for the participating actions and use that total to determine the current success influence score for each participating action, such as by dividing a participating action's historical influence score by the combined historical influence scores of all the participating actions. For instance, the total for this example would be 0.02+0.05+0.1+0.01=0.18 and dividing the 0.02 historical influence score for PA1 by this total=0.11, so Success Influence Analyzer 180 may assign PA1 11% of the credit for the success event. Thus, Success Influence Analyzer 180 may be configured to weigh each participating action's current success influence score according to an overall success value for the success event. In the example above, the success event may be considered to have an overall success value of 1.0.

The Linear Influence column of FIG. 8 is shown to illustrate the difference between Success Attributes using Historical Influence compared to a straight linear attribution of influence (e.g., in which each participating action may receive equal credit for the success event). Thus, in the example illustrated in FIG. 8, participating action PA 4 may receive 25% of the success influence under a linear attribution model, but if its current success influence score is assigned according to its historical influence, it may receive only 6% of the current success influence. Similarly, participating action PA 3 has a larger historical influence and therefore may be assigned a larger current success influence score.

While in the examples above current success influence scores are described in terms of an overall success value of 1.0, in some embodiments Success Influence Analyzer 180 may be configured to use other overall success values when determining current success influence scores. For example, when assigning current success influence scores regarding a success event relating to an online purchase Success Influence Analyzer 180 may use the purchase price (or other value of the purchased product/service) as the overall success value.

For instance, if a product worth $5.00 was purchased, an overall success value of 5 may be used by Success Influence Analyzer 180 when determining current success influence scores. Continuing this $5.00 example, participating action PA 1 of FIG. 8 may be given a current success influence score of 11% of 5 (0.55), rather than just 11% of 1 (0.11).

While in the example above a participating action's current influence score is determined as a ratio of its historical influence score to the total of the historical influence scores of all participating actions, other methods off assigning a current influence score may be used, according to different embodiments.

Figure 9:
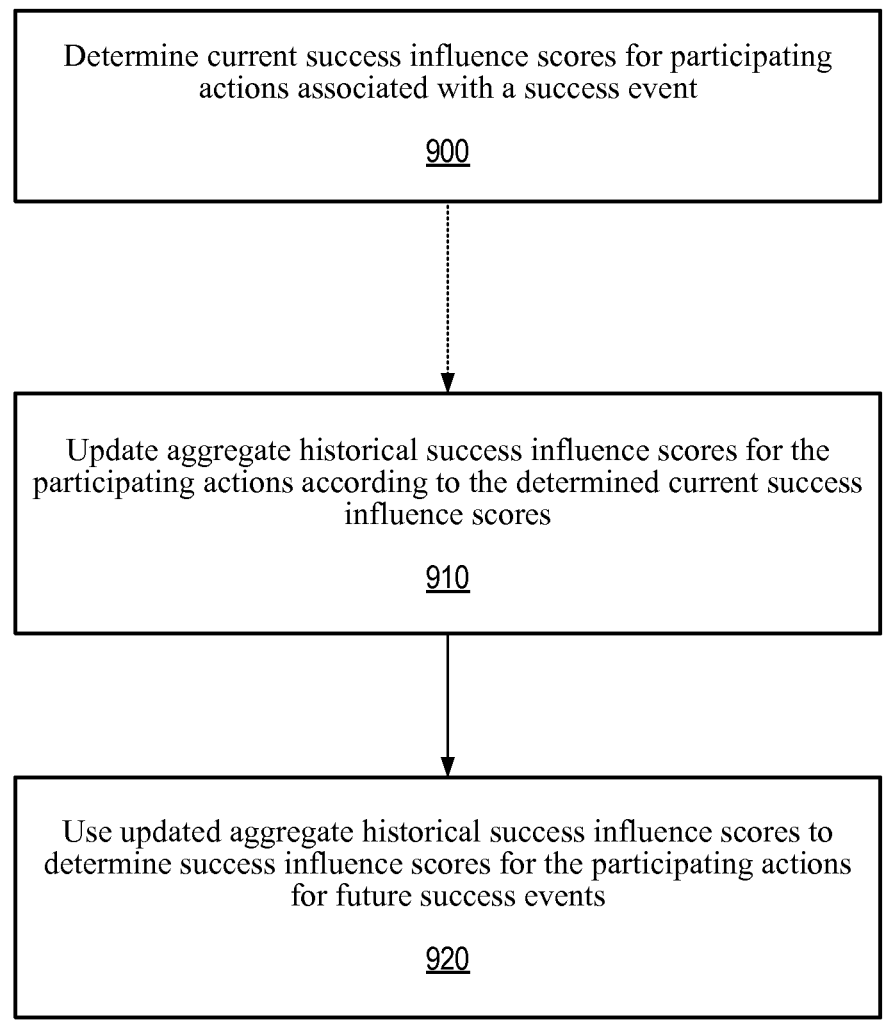
FIG. 9 is a flow chart showing one embodiment of a method for updating historical influence scores as part of using historical influence for success attribution, as described herein.

FIG. 9 is a flowchart illustrating one embodiment of a method for updating historical influence data based on current success influence scores. As described above, Success Influence Analyzer 180 may be configured to determine current success influence scores for participating actions associated with a success event, as shown in block 900. Success Influence Analyzer 180 may also be configured to update historical success influence scores for the participating actions according to the determined current success influence scores, as shown in block 910. Thus, in some embodiments, Success Influence Analyzer 180 may be configured to record, store or otherwise save the current success influence scores of the participating action as new historical influence scores.

In some embodiments, the updated historical influence scores may be determined using a different success attribution model than was used to originally determine the historical influence scores in the previously recorded metric. For example, in one embodiment, Success Influence Analyzer 180 may obtain a previously recorded metric (such as from Historical Influence Database 170) that includes historical influence scores determined using any of various attribution models, such as First Touch, Last Touch and/or Linear (among others). Success Influence Analyzer 180 may then assign current success influence scores by apportioning historical influence scores using the methods described herein, and may further update the historical influence data to include the current success influence scores. Thus, in some embodiments, the stored historical influence data may include success influence information determined using different success attribution models.

In one embodiment, Success Influence Analyzer 180 may be configured to update an aggregate historical influence score for each of the participating actions associated with the success event. For instance, an updated aggregate historical influence value for a participating action may be based on a combination of the participating action's current success influence score and the previous aggregate historical influence score for the participating action. Referring back to FIG. 7 and FIG. 8, if the current Success Influence scores illustrated in FIG. 8 refer to success event A, then Success Influence Analyzer 180 may update the values for participating actions 1, 2, 3, 4 and 5 for Success Event A in FIG. 7 to reflect the newly determined current success influence scores of FIG. 8. Success Influence Analyzer 180 may also be configured to update the historical influence data, such as may be stored in Historical Influence Database 170, to include updated aggregate influence scores for the participating actions, according to one embodiment.

In one embodiment, updating the historical influence data may involve determining new aggregate values, while in other embodiments, the newly determined success influence scores may be added as additional data that can be accessed separately. In yet other embodiments, the new current success influence scores may replace the older historical influence scores.

Additionally, Success Influence Analyzer 180 may use the updated historical success influence scores to determine success influence scores for participating actions associated with future instances of success events, as shown in block 920 and according to some embodiments. For instance, Success Influence Analyzer 180 may be configured to update the stored historical influence data to include the updated aggregate historical influence scores for each participating action and to use the updated historical influence data for subsequent success events. Thus, success attribution using historical influence data may be considered to auto-correct over time. In other words, since Success Attribution using Historical Influence may be based on continually updated historical influence data (e.g., updated with each new instance of a success event), as those data change, so may the success influence scores for participating actions. For example, if participating action PA4 of FIG. 8 is a previously unused keyword, but quickly becomes a hot buzzword that is used frequently, its historical influence score may begin low but may quickly rise to represent the keyword's current influence on success events as the keyword becomes popular. Thus, from a "cold start" situation in which a participating action has not had much (or any) historical influence, by repeatedly updating its historical influence score based on its current success influence scores, its current influence on success events may be reflected in its updated historical influence score, according to some embodiments.

Figure 10:
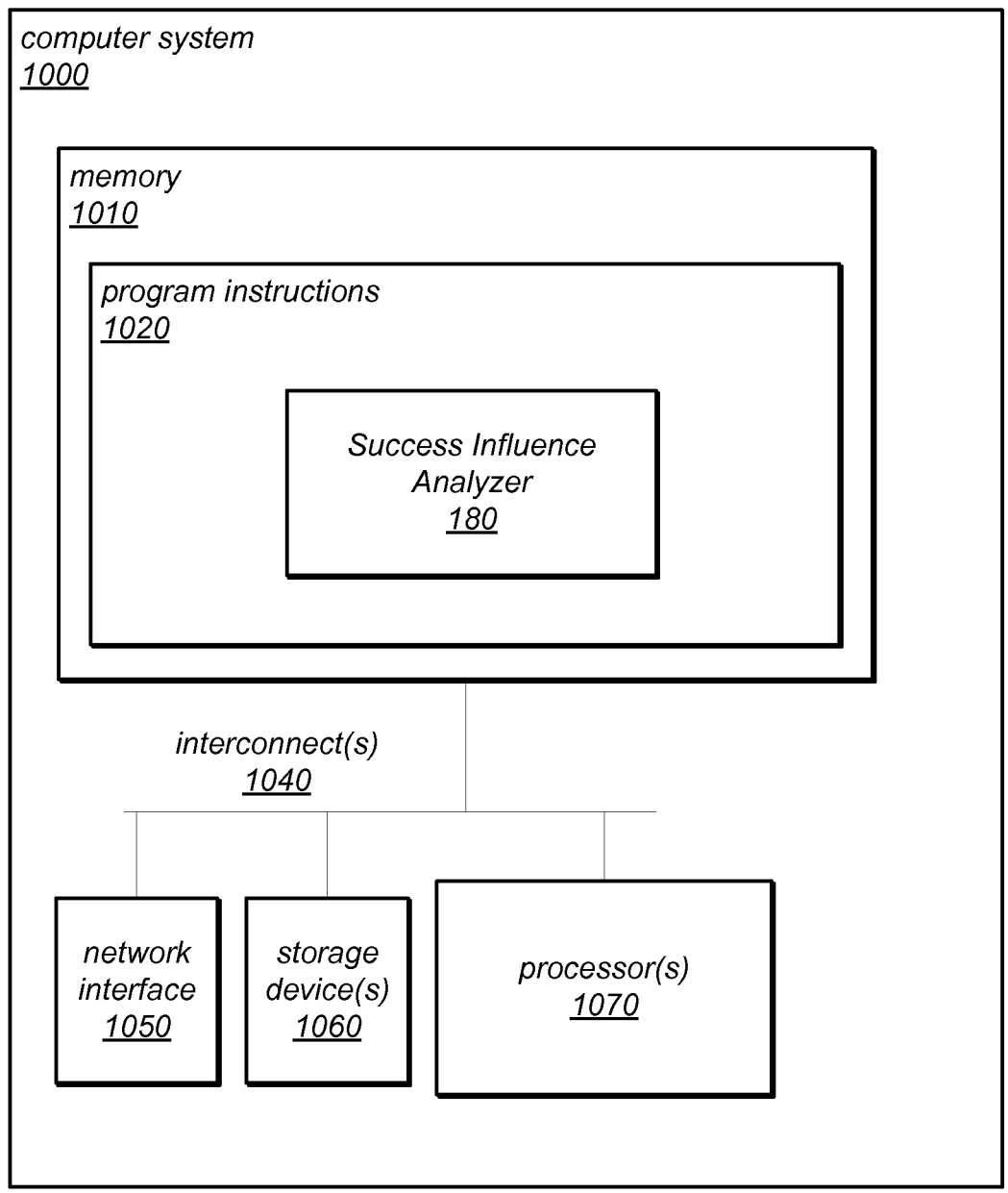
FIG. 10 is a logical block diagram illustrating an example system configured to perform success attribution using historical influence, according to one embodiment.

The techniques described herein for using historical influence for success attribution may be implemented in any of a wide variety of computing systems. FIG. 10 illustrates an example computing system that is configured to implement Success Attribution by Historical Influence, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

In some embodiments, the methods described herein may be implemented by a computer program product, or software. In some embodiments a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1000 may include a processor unit 1070 (possibly including multiple processors, a single-threaded processor, a multi-threaded processor, a multi-core processor, etc.) which may be configured to execute one or more applications, such as Success Influence Analyzer 180, which may be present within program instructions 1020 stored in memory 1010 of the same computer system 1000 or may be present within program instructions stored within a memory of another computer system similar to or different from computer system 1000.

The computer system 1000 may include one or more system memories 1010 (e.g., one or more of cache, SRAM DRAM, RDRAM, EDO RAM, DDR RAM, SDRAM, Rambus RAM, EEPROM, etc.), a system interconnect 1040 (e.g., LDT, PCI, ISA, etc.), a network interface 1050 (e.g., an ATM interface, an Ethernet interface, a Frame Relay interface, etc.), and one or more storage device(s) 1045 (e.g., optical storage, magnetic storage, etc.). The memory medium may include other types of memory as well, or combinations thereof. In other embodiments, computer system 1000 may include more, fewer, or different components than those illustrated in FIG. 10 (e.g., video cards, audio cards, additional network interfaces, peripheral devices, etc.). The processor(s) 1070, the storage device(s) 1045, the network interface 1050 and the system memory 1010 may be coupled to the system interconnect 1040.

One or more of the system memories 1010 may include program instructions 1020 configured to implement some or all of the techniques described herein for using Historical Influence for Success Attribution (according to any of the embodiments described herein). For example, one or more of the system memories 1010 may include code to implement and/or execute Success Influence Analyzer 180, according to one embodiment.

In various embodiments, program instructions 1020, Success Influence Analyzer 180, and/or individual sub-modules of these components may each be implemented in any of various programming languages or methods. For example, in one embodiment, Success Influence Analyzer 180 may be JAVA based, while in another embodiment, it may be written using the C or C++ programming languages. Moreover, in some embodiments, Success Influence Analyzer 180 and various sub-modules of Success Influence Analyzer 180 may not be implemented using the same programming language.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
   performing, by a computer:
   associating one or more participating actions with a success event; wherein each of the one or more participating actions comprises a user action on a network-based content site;
   determining a historical influence score for each of the one or more participating actions based on a previously measured metric associating the one or more participating actions with previous instances of the success event; and
   assigning a current success influence score to each of the one or more participating actions based on the respective participating action's historical influence score as a proportion of a total of the historical influence scores of the one or more participating actions.

2. The method of claim 1, wherein said assigning a current success influence score comprises attributing a portion of an overall success value for the success event to each of the one or more participating actions, and wherein the current success influence score indicates a level of contribution by the respective participating action toward the success event.

3. The method of claim 1, wherein the historical influence score of each respective participating action comprises an aggregate influence value for the respective participating action, and wherein the aggregate influence value is a combination of previous success influence values for the respective participating action.

4. The method of claim 3, further comprising combining the current success influence score of the respective participating action into the aggregate influence value for the respective participating action.

5. The method of claim 1, wherein the previously measured metric comprises, for each of the one or more participating actions, a corresponding conversion ratio; wherein a respective conversion ratio comprises a ratio of a total number of times the corresponding participating action was previously associated with an instance of the success event as compared to a total number of previous instances of the success event.

6. The method of claim 1, wherein the previously measured metric comprises historical influence scores for participating actions associated with previous instances of the success event occurring only on the network-based content site.

7. The method of claim 1, wherein the previously measured metric comprises historical influence scores for participating actions associated with previous instances of the success event occurring on multiple network-based content sites.

8. The method of claim 1, wherein the historical influence score is based on previous instances of the success event that occurred within a predetermined age threshold.

9. A non-transitory, computer-readable storage medium storing program instructions that when executed on one or more computers cause the one or more computers to perform:
   associating one or more user actions on a network-based content site with a success event;
   determining a historical influence score for each of the one or more user actions based on a previously measured metric associating the one or more user actions with previous instances of the success event; and
   assigning a current success influence score to each of one or more participating actions of the one or more user actions based on the respective participating action's historical influence score as a proportion of a total of the historical influence scores of the one or more participating actions.

10. The medium of claim 9, wherein said assigning a current success influence score comprises attributing a portion of an overall success value for the success event to each of the one or more participating actions, and wherein the current success influence score indicates a level of contribution by the respective participating action toward the success event.

11. The medium of claim 9, wherein the success event comprises a web purchase of a product or service, and wherein the previously measured metric comprises historical influence scores associated with previous purchases of the product or service.

12. The medium of claim 9, wherein each of the one or more participating actions correspond to at least one of: a web search, selecting a web link, visiting a web page, or entering data into a data entry field of the network-based content site.

13. The medium of claim 9, wherein the one or more user actions comprise a plurality of user actions, and wherein the program instructions further cause the one or more computers to perform:
   determining that one or more of the plurality of user actions is a non-contributing action that does not contribute to the success event; wherein said assigning a current success influence score is not performed for the one or more non-contributing actions.

14. The medium of claim 13, wherein said determining that one of the user actions is a non-contributing action comprises determining that the user action comprises a user checkout action that occurs prior to web purchases via the network-based content site, and wherein the success event is a web purchase via the network-based content site.

15. The medium of claim 13, wherein determining that one of the user actions is a non-contributing action comprises determining that the historical influence score for the user action is above a pre-determined occurrence threshold.

16. A system, comprising:
   a data store storing historical influence data for a network-based site; and
   one or more processors configured to implement a success influence analyzer, wherein the success influence analyzer is configured to:
   associate one or more participating actions with a success event, wherein each participating action comprises a user action on a network-based content site;
   access the historical influence data on the data store to determine a historical influence score for each of the one or more participating actions based on a previously measured metric associating the one or more participating actions with previous instances of the success event; and assign a current success influence score to each of the one or more participating actions based on the respective participating action's historical influence score as a proportion of a total of the historical influence scores of the one or more participating actions.

17. The system of claim 16, wherein to assign a current success influence score the success influence analyzer is configured to attribute a portion of an overall success value for the success event to each of the one or more participating actions, and wherein the current success influence score indicates a level of contribution by the respective participating action toward the success event.

18. The system of claim 16, wherein the success influence analyzer is further configured to update the data store according to the current success influence score of each of the one or more participating actions.

19. The system of claim 16, wherein the historical influence data on the data store comprises an aggregate influence value for each of the one or more participating actions and wherein the success influence analyzer is further configured to determine the historical influence score of each of the one or more participating actions based on the aggregate influence value for the respective participating action.

20. The system of claim 19, wherein the success influence analyzer is further configured to update the historical influence data on the data store to include an updated aggregate influence value for each of the one or more participating actions, wherein the updated aggregate influence value for each respective participating action is based on a combination of the current success influence score and the aggregate influence value for the respective participating action.

* * * * *